United States Patent
Luedtke

(10) Patent No.: US 10,399,456 B2
(45) Date of Patent: Sep. 3, 2019

(54) AUTOMOTIVE VEHICLE AND METHOD OF CONTROLLING AN ELECTRIC MACHINE THEREIN

(75) Inventor: Daniel R. Luedtke, Berkley, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 2337 days.

(21) Appl. No.: 12/466,467

(22) Filed: May 15, 2009

(65) Prior Publication Data

US 2010/0292879 A1 Nov. 18, 2010

(51) Int. Cl.
*B60W 20/00* (2016.01)
*B60L 15/20* (2006.01)

(52) U.S. Cl.
CPC ............. *B60L 15/20* (2013.01); *Y02T 10/645* (2013.01); *Y02T 10/72* (2013.01); *Y02T 10/7275* (2013.01)

(58) Field of Classification Search
CPC .............................. B60L 15/20; Y02T 10/7275
USPC ....................... 701/22; 180/65.2, 249; 477/5; 123/179.4
See application file for complete search history.

(56) References Cited

U.S. PATENT DOCUMENTS

| | | | |
|---|---|---|---|
| 4,766,967 A | 8/1988 | Slicker et al. | |
| 6,629,025 B2 | 9/2003 | Evans et al. | |
| 7,024,290 B2 | 4/2006 | Zhao et al. | |
| 7,292,917 B2 | 11/2007 | Kuang | |
| 7,344,129 B2 | 3/2008 | Nemoto | |
| 7,347,122 B2 | 3/2008 | Clausin | |
| 7,434,647 B2 * | 10/2008 | Sugo et al. | 180/249 |
| 7,670,256 B2 * | 3/2010 | Winkelmann et al. | 477/5 |
| 7,953,538 B2 * | 5/2011 | Matsubara et al. | 701/99 |
| 2006/0025905 A1 | 2/2006 | Zhao et al. | |
| 2006/0025906 A1 | 2/2006 | Syed et al. | |
| 2006/0037804 A1 | 2/2006 | Sugo et al. | |
| 2007/0056784 A1 * | 3/2007 | Joe et al. | 180/65.2 |
| 2007/0225887 A1 | 9/2007 | Morris | |
| 2007/0295297 A1 * | 12/2007 | Tamai et al. | 123/179.4 |
| 2009/0042690 A1 * | 2/2009 | Tabata et al. | 477/5 |
| 2010/0227734 A1 * | 9/2010 | Wallner et al. | 477/5 |

* cited by examiner

*Primary Examiner* — Marthe Y Marc-Coleman
(74) *Attorney, Agent, or Firm* — David B. Kelley; Brooks Kushman P.C.

(57) ABSTRACT

A method for controlling an electric machine of a vehicle drivetrain may include determining a rotational speed of the electric machine, determining a rotational speed of a drivetrain component other than the electric machine, and modifying a torque command to the electric machine based on a difference between the rotational speeds to dampen drivetrain vibrations.

14 Claims, 3 Drawing Sheets

AUTOMOTIVE VEHICLE AND METHOD OF CONTROLLING AN ELECTRIC MACHINE THEREIN

BACKGROUND

United States Patent Application Publication Number 2007/0225887 to Morris provides a multivariate control method and system to control torque output from a powertrain system to a driveline. The powertrain comprises a hybrid powertrain having a plurality of torque-generative devices connected to a transmission. Desired powertrain and driveline operating states are determined, as are a plurality of operating state errors. Each torque-generative device is controlled, based on the operating state errors, and operating mode of the transmission. A damping torque command, additive to a commanded torque, is determined for one or more of the torque-generative devices based on the determined transmission operating mode.

U.S. Pat. No. 7,344,129 to Nemoto provides a damping method for a hybrid vehicle in which a power unit consisting of an engine and a motor is supported in a vehicle body frame via an active vibration isolation support system. The method includes a step of damping vibration of the power unit by the active vibration isolation support system, and a subsequent step of controlling operation of the motor to damp vibration that has not been eliminated by the active vibration isolation support system.

U.S. Pat. No. 6,629,025 to Evans et al. provides a surge suppression control for a motor vehicle drivetrain that detects and suppresses drivetrain oscillation in a predetermined range of frequencies centered on an estimate of the natural frequency of the drivetrain. The drivetrain natural frequency is determined based on the current speed ratio of the vehicle transmission and empirically determined vehicle characteristics, and is used to define the center frequency of a band-pass filter responsive to engine speed. The filter output represents the AC component of the engine speed in a range of frequencies centered on the driveline natural frequency, and such component is differentiated to form an acceleration component in phase synchronism with the torque causing the detected resonance. An electric machine mechanically coupled to the engine is energized in accordance with the inverse of the acceleration component to actively cancel the detected resonance whenever the acceleration component exceeds a noise threshold that also is adjusted based on the estimated natural frequency of the drivetrain.

SUMMARY

A method for controlling an electric machine of a vehicle drivetrain may include determining a rotational speed of the electric machine, determining a rotational speed of a drivetrain component other than the electric machine, and modifying a torque command to the electric machine based on a difference between the rotational speeds to dampen drivetrain vibrations.

An automotive vehicle may include at least one controller and a drivetrain including an electric machine. The at least one controller may be configured to determine a difference in rotational speeds between the electric machine and a drivetrain component other than the electric machine and to modify a torque request to the electric machine based on the difference in rotational speeds.

An automotive vehicle may include at least one controller and a drivetrain including an electric machine. The at least one controller may be configured to determine a rotational speed of the electric machine, to determine a rotational speed of a drivetrain component other than the electric machine, and to determine a difference in the rotational speeds. The at least one controller may be further configured to determine whether the difference in rotational speeds is greater than a threshold and to modify a torque request to the electric machine by an amount that is proportional to the difference in rotational speeds if the difference in rotational speeds is greater than the threshold.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 1:
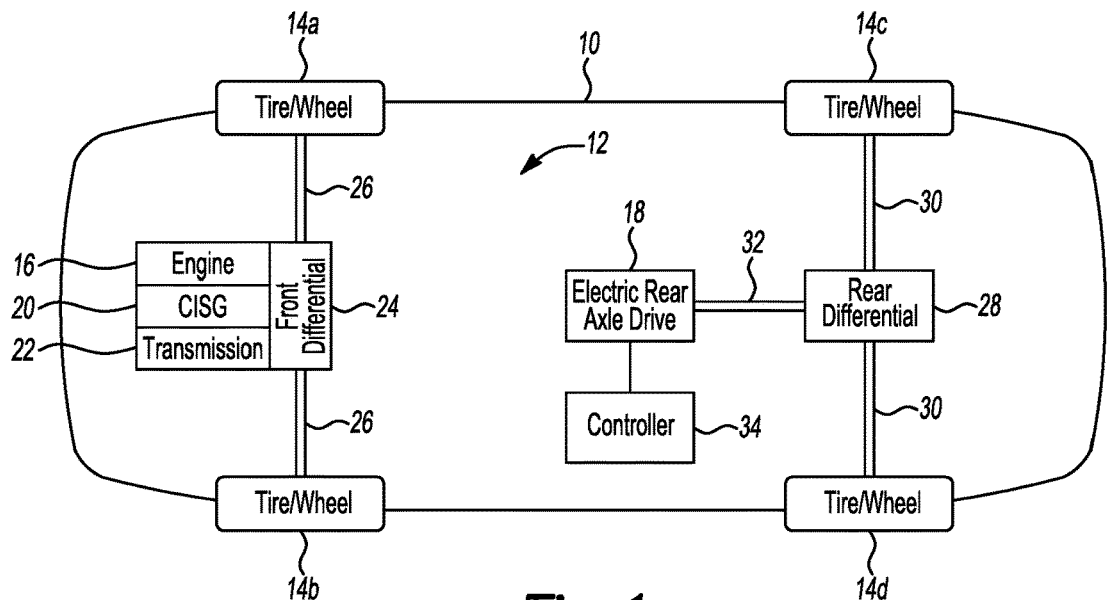
FIG. 1 is a block diagram of an example configuration of a hybrid electric vehicle.

Referring now to FIG. 1, an automotive vehicle 10 may include a drivetrain 12. The drivetrain 12 may include tire/wheel assemblies 14*n* (14*a*, 14*b*, 14*c*, 14*d*), an engine 16, and electric machine (e.g., electric rear axle drive) 18. The drivetrain 12 may also include a crank integrated starter/generator (CISG or other electric machine) 20, transmission 22, front differential 24, and front half shafts 26. (As apparent to those of ordinary skill, components immediately adjacent to each other are mechanically connected.) The drivetrain 12 may further include a rear differential 28, rear half shafts 30, and a rear prop shaft 32.

As known in the art, the CISG 20 may be used to start or stop the engine 16; the engine may generate motive power to drive the tire/wheel assemblies 14*a*, 14*b* via the transmission 22, front differential 24, and front half shafts 26. As also known in the art, the electric machine 18 may act as a motor to generate motive power to drive the tire wheel assemblies 14*c*, 14*d* via the rear prop shaft 32, rear differential 28, and rear half shafts 30; the electric machine 18 may also act as a generator to generate electrical power for storage by a suitable power storage unit, e.g., battery, etc. Either or both of the engine 16 and electric machine 18 may be used to generate motive power to drive the tire/wheel assemblies 14*n*.

A controller 34 (or controllers) in communication with the electric machine 18 may submit torque commands/requests to the electric machine 18 such that, for example, the electric machine 18 generates motive power to move the tire wheel assemblies 14*c*, 14*d*. As explained below, these torque commands/requests may be altered to dampen vibrations within the drivetrain 12.

Figure 2:
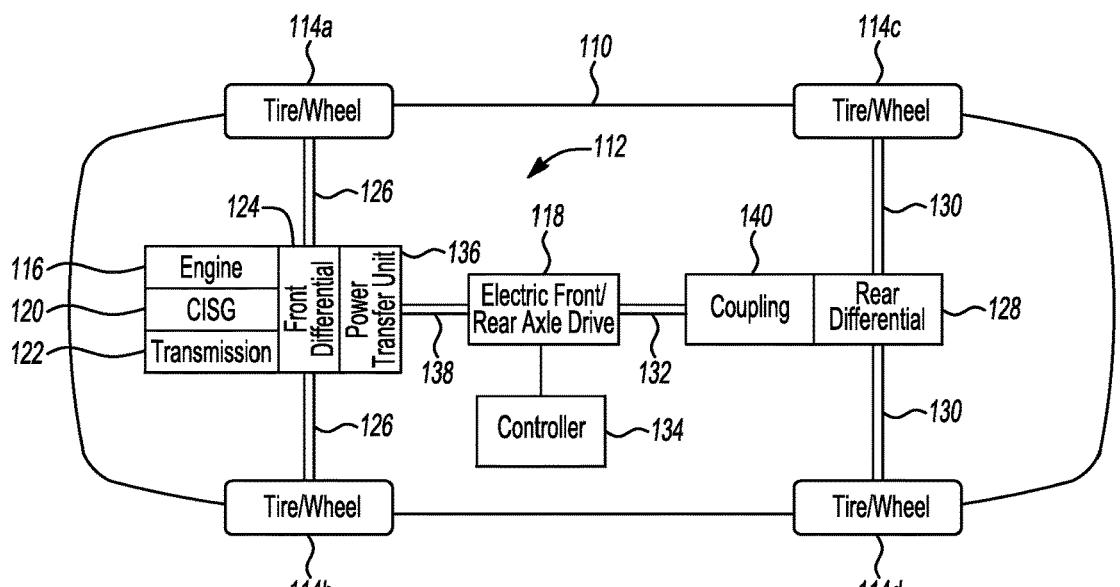
FIG. 2 is a block diagram of another example configuration of a hybrid electric vehicle.

Referring now to FIG. 2, numbered elements that differ by 100 relative to FIG. 1 have similar descriptions to the numbered elements of FIG. 1. The drivetrain 112 of FIG. 2 includes a power transfer unit 136, front prop shaft 138, and a coupling 140. As known in the art, these additional components may (i) permit the engine 116 to drive any of the tire/wheel assemblies 114n and (ii) permit the electric machine 118 to drive any of the tire/wheel assemblies 114n. Of course, other drivetrain configurations are also possible.

Figure 3:
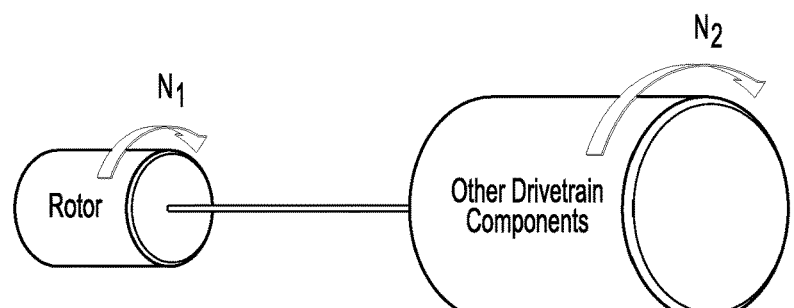
FIG. 3 is a schematic representation of the drivetrain components of FIGS. 1 and 2.

Referring now to FIG. 3, a hybrid drivetrain is schematically illustrated as a pair of cylinders connected by a shaft. The cylinder on the left represents a rotor of an electric machine. The cylinder on the right represents the rest of the drivetrain components. The relative size of the cylinders represents the difference in mass between the rotor and the rest of the drivetrain components. The shaft has a spring rate that represents the effective stiffness of the drivetrain components other than the rotor.

Drivetrain oscillations may be induced by various events, such as a harsh change in the torque command, that result in differences in the rotational speeds of the rotor and the rest of the drivetrain components. If for example, the rotor has a rotational speed N1 that is greater than the rotational speed N2 of the rest of the drivetrain components, the rotor may wind up the drivetrain (wind up the shaft connecting the two cylinders). This winding up may continue until the stiffness of the drivetrain slows the rotational speed N1 of the rotor to the point where it reverses direction relative to the rotational speed N2 of the rest of the drivetrain. As the relative speed of the rotor reverses direction, the drivetrain will unwind and begin to wind up in the other direction. If the natural frequency of the drivetrain is excited, this oscillation can build to unacceptable levels, resulting in vibrations that may cause additional losses in the drivetrain system.

Figure 4:
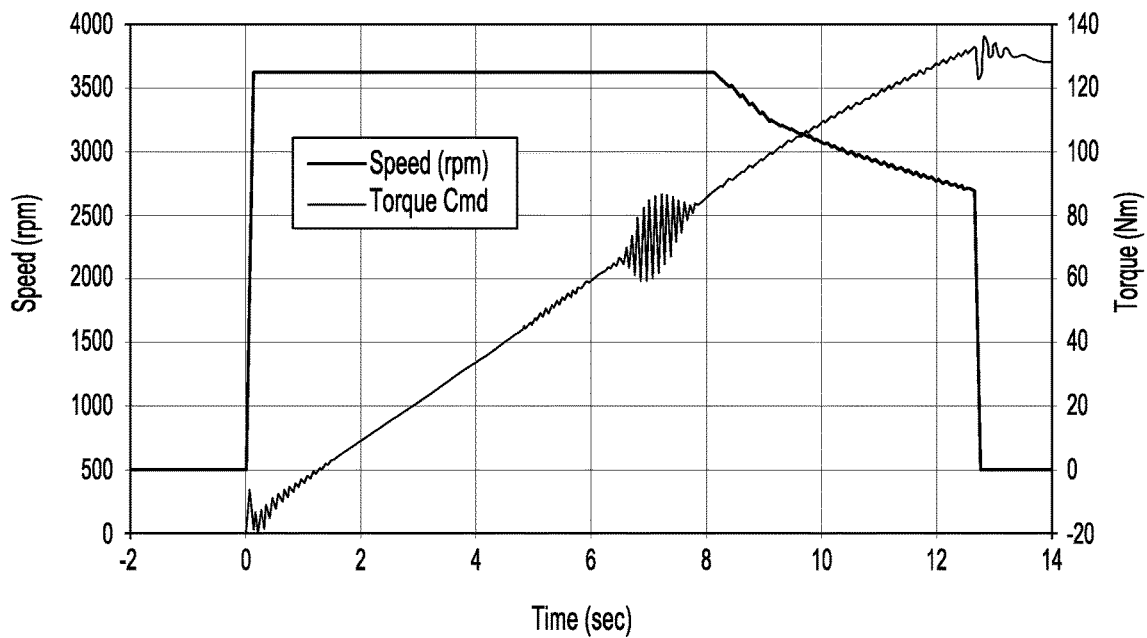
FIG. 4 is an example plot of rotor speed and rotor torque command versus time.

Referring now to FIG. 4, test data of the operation of a drivetrain similar to that described with reference to FIG. 2 reveals that rotor speed oscillates (i) as a torque command is applied, (ii) as the torque command is removed, and (iii) around 7 seconds after the torque command is applied. (During the test, an engine was generating motive power and an electric machine was being brought on line to also produce motive power.)

Uncontrolled winding of the tested drivetrain (as described with reference to FIG. 3) results in rotor speed oscillation as the torque command is applied. Likewise, uncontrolled unwinding of the tested drivetrain (as described with reference to FIG. 3) results in rotor speed oscillation as the torque command is removed. Such rotor oscillations may propagate through the entire drivetrain and be perceived by the vehicle's occupants as vibrations.

Drivetrain vibrations caused by rotor oscillations may be reduced, for example, by (i) stiffening various drivetrain components, or (ii) optimizing electric machine vehicle mounts. Undesirable increases in component weight, size and cost, however, may accompany efforts to stiffen drivetrain components. Likewise, increases in cost and complexity may accompany efforts to optimize electric machine vehicle mounts.

Referring again to FIGS. 1 and 2, the controllers 34, 134 may implement an active control strategy for reducing/eliminating rotor oscillations (as discussed with reference to FIGS. 3 and 4) associated with the electric machines 18, 118. As will be discussed in detail, torque commands issued by the controllers 34, 134 to the electric machines 18, 118 may be altered based on a difference in rotational speeds between the electric machines 18, 118 and other components of the drivetrains 12, 112.

Figure 5:
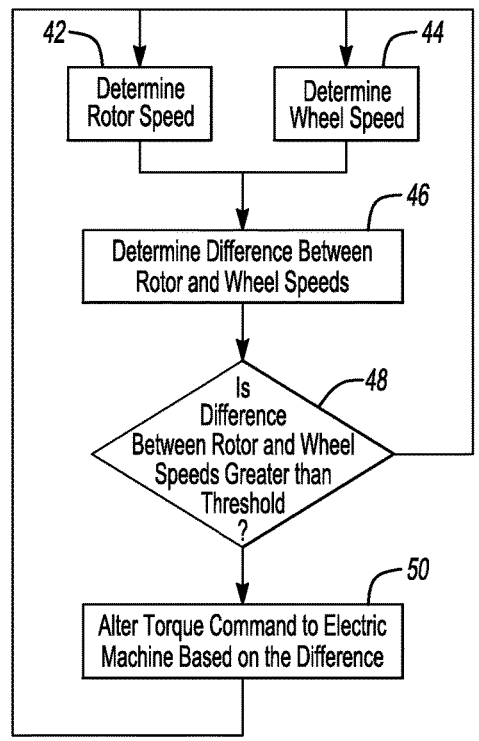
FIG. 5 is a flow chart illustrating an embodiment of a control strategy for the electric machines of FIGS. 1 and 2.

Referring now to FIG. 5, a rotational speed of an electric machine (rotor) is determined as indicated at 42. This rotational speed may be determined in any suitable fashion. For example, it may be directly measured or estimated using an observer as known in the art, etc.

As indicated 44, a rotational speed of a drivetrain component other than the electric machine, e.g., wheel, prop shaft, etc., is determined. This rotational speed may likewise be determined in any suitable fashion. For example, it may be estimated using an observer, a reduced-order observer, a low-pass filter, or brake system measurements as known in the art.

As indicated at 46, a difference between the rotational speeds is determined. For example, the rotational speed of the wheel may be subtracted from the rotational speed of the rotor.

As indicated at 48, it is determined whether the difference in rotational speeds is greater than a threshold. If no, the strategy returns to 42, 44. If yes, the strategy proceeds to 50. Depending on the topology, configuration, compliance, etc. of the drivetrain, some difference in the rotational speeds of the electric machine and the rest of the drivetrain may be tolerable. That is, it may not, for example, result in perceptible vibrations. This threshold difference may be determined via simulation, vehicle testing, etc.

As indicated at 50, the torque command to the electric machine is altered based on the difference between the rotational speeds. The amount by which the torque command is altered may be proportional to the difference in rotational speeds.

The time during which a loop of the above strategy executes (the time from the start of 42 to the end of 50) may be set so as to be less than the time it takes for the drivetrain to wind up or wind down. As discussed above, the uncontrolled winding up or down of a drivetrain may initiate electric machine speed oscillations. Adjusting the torque command to the electric machine (which affects electric machine speed) before the complete wind up or down of the drivetrain may prevent the onset of oscillatory behavior.

Figure 6:
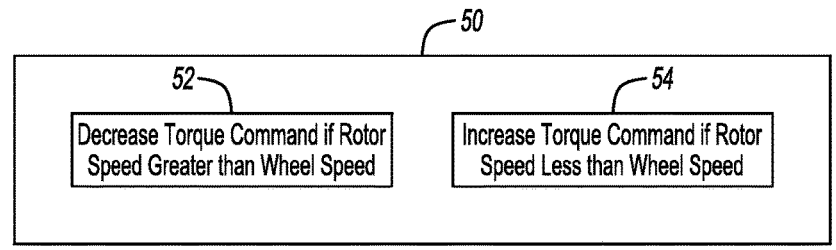
FIG. 6 is a flow chart illustrating a portion of FIG. 5.

Referring now to FIG. 6, the torque command to the electric machine may be decreased if the difference in rotational speeds is positive as indicated 52. If, for example, the current torque command is x N·m and there is a +y rpm difference in rotational speeds, the current torque command, x N·m, may be altered by an amount z N·m that is proportional to the +y rpm difference $$z\ N\cdot m = +y\ \text{rpm}^* - k\ N\cdot m/\text{rpm}. \quad (1)$$

k is a gain that is specific to a particular drivetrain and may be determined via simulation, vehicle testing, etc. The altered torque command, q N·m, may then be given by $$q\ N\cdot m = x\ N\cdot m + z\ N\cdot m. \quad (2)$$

Note that q is less than x because z is negative in the above scenario.

As indicated at 54, the torque command to the electric machine may be increased if the difference in rotational speeds is negative. According to (1), z will be positive as there will be a −y rpm difference in rotational speeds. According to (2), q will be greater than x because z is positive.

Figure 7:
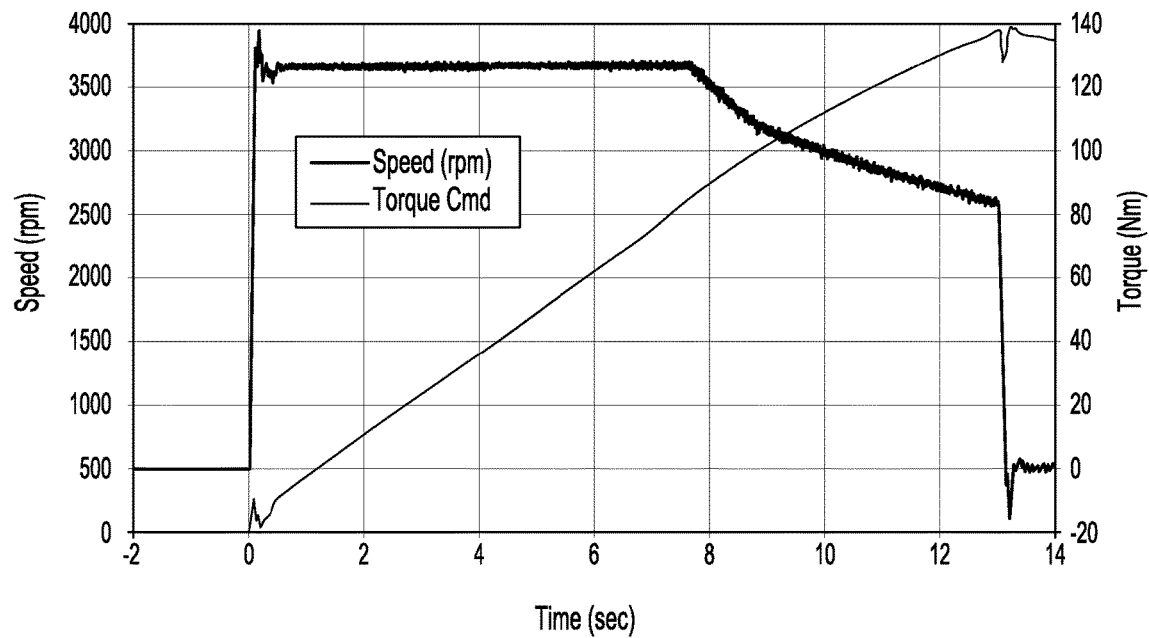
FIG. 7 is another example plot of rotor speed and rotor torque command versus time.

Referring now to FIG. 7, the drivetrain tested with reference to FIG. 4 was modified to include an active damping strategy similar to that discussed with reference to FIGS. 5 and 6. The test data reveals that (i) rotor speed oscillations as a torque command is applied and as the torque command is removed are substantially reduced, and (ii) rotor speed oscillations during speed ramp up (particularly around seven seconds after the torque command is applied) are substantially eliminated. (During the test, an engine was generating motive power and an electric machine was being brought on line to also produce motive power.)

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A method for controlling an electric machine of a vehicle drivetrain, the method comprising:
   modifying a torque command to the electric machine in response to a difference between a speed of the electric machine and a speed of a drivetrain component other than the electric machine exceeding a threshold that is based on a compliance associated with the drivetrain to dampen drivetrain vibrations.

2. The method of claim 1 wherein modifying a torque command to the electric machine includes increasing the torque command to the electric machine if the speed of the electric machine is less than the speed of the drivetrain component other than the electric machine.

3. The method of claim 2 wherein the amount by which the torque command is increased is proportional to the difference between the speeds.

4. The method of claim 1 wherein modifying a torque command to the electric machine includes decreasing the torque command to the electric machine if the rotational speed of the electric machine is greater than the speed of the drivetrain component other than the electric machine.

5. The method of claim 4 wherein the amount by which the torque command is decreased is proportional to the difference between the speeds.

6. The method of claim 1 wherein the drivetrain component other than the electric machine is a wheel.

7. An automotive vehicle comprising:
   a drivetrain including an electric machine; and
   at least one controller configured to modify a torque request to the electric machine in response to a difference between a speed of the electric machine and a speed of a drivetrain component other than the electric machine exceeding a threshold that is based on a compliance associated with the drivetrain.

8. The vehicle of claim 7 wherein modifying a torque request to the electric machine includes increasing the torque request to the electric machine if the speed of the electric machine is less than the speed of the drivetrain component other than the electric machine.

9. The vehicle of claim 8 wherein the amount by which the torque request is increased is proportional to the difference in speeds.

10. The vehicle of claim 7 wherein modifying a torque request to the electric machine includes decreasing the torque request to the electric machine if the speed of the electric machine is greater than the speed of the drivetrain component other than the electric machine.

11. The vehicle of claim 10 wherein the amount by which the torque request is decreased is proportional to the difference in speeds.

12. An automotive vehicle comprising:
    a drivetrain including an electric machine; and
    at least one controller configured to modify a torque request to the electric machine by an amount that is proportional to a difference between a speed of the electric machine and a speed of a drivetrain component other than the electric machine in response to the difference exceeding a threshold that is based on a compliance associated with the drivetrain.

13. The vehicle of claim 12 wherein modifying a torque request to the electric machine includes increasing the torque request to the electric machine if the speed of the electric machine is less than the speed of the drivetrain component other than the electric machine.

14. The vehicle of claim 12 wherein modifying a torque request to the electric machine includes decreasing the torque request to the electric machine if the speed of the electric machine is greater than the speed of the drivetrain component other than the electric machine.

* * * * *